(12) United States Patent
Simell et al.

(10) Patent No.: US 8,936,658 B2
(45) Date of Patent: Jan. 20, 2015

(54) METHOD OF REFORMING GASIFICATION GAS

(75) Inventors: Pekka Simell, VTT (FI); Esa Kurkela, VTT (FI); Ilkka Hiltunen, VTT (FI)

(73) Assignee: Neste Oil Oyj, Espoo (FI)

( * ) Notice: Subject to any disclaimer, the term of this patent is extended or adjusted under 35 U.S.C. 154(b) by 51 days.

(21) Appl. No.: 13/598,273

(22) Filed: Aug. 29, 2012

(65) Prior Publication Data
US 2013/0047511 A1 Feb. 28, 2013

Related U.S. Application Data

(63) Continuation of application No. PCT/FI2011/050181, filed on Mar. 3, 2011.

(30) Foreign Application Priority Data

Mar. 3, 2010 (FI) .................................... 20105201

(51) Int. Cl.
- *C01B 3/24* (2006.01)
- *B01J 23/00* (2006.01)
- *C10J 3/84* (2006.01)

(Continued)

(52) U.S. Cl.
CPC ............ *C10J 3/00* (2013.01); *C10J 2300/0956* (2013.01); *C10J 2300/0959* (2013.01); *C10J 3/84* (2013.01); *C10K 1/34* (2013.01); *B01J 23/40* (2013.01); *Y02E 20/18* (2013.01); *C10J 3/482* (2013.01); *C10K 3/023* (2013.01); *B01J 21/066* (2013.01); *C10J 2300/0973* (2013.01); *C10J 2300/0916* (2013.01)
USPC .......................... 48/197 R; 423/644; 502/349

(58) Field of Classification Search
USPC .......................................... 48/197 R; 502/349
See application file for complete search history.

(56) References Cited

U.S. PATENT DOCUMENTS

| 3,388,074 A | 6/1968 | Reitmeier |
| 4,005,996 A * | 2/1977 | Hausberger et al. ........ 48/197 R |

(Continued)

FOREIGN PATENT DOCUMENTS

| CN | 1523082 A | 8/2004 |
| CN | 101454427 A | 6/2009 |

(Continued)

OTHER PUBLICATIONS

International Search Report (PCT/ISA/210) issued on Jun. 9, 2011, by the Finnish Patent Office as the International Searching Authority for International Application No. PCT/FI2011/050181.

(Continued)

*Primary Examiner* — Matthew Merkling
(74) *Attorney, Agent, or Firm* — Buchanan Ingersoll & Rooney PC

(57) ABSTRACT

A method of reforming a gasification gas, in order to decompose the impurities contained therein, and a use of a noble metal catalyst in the pre-reforming of gasification gas. The gas is brought into contact with a metal catalyst in the presence of an oxidizing agent. The reformation is carried out in several stages, wherein in at least one of the first stages a noble metal catalyst is used, and in a second stage which follows the first stage the catalyst used is a metal catalyst. The use of a noble metal catalyst can reduce the risk of deactivation of the metal catalysts and can increase the operating life of the catalyst.

25 Claims, 1 Drawing Sheet

(51) Int. Cl.
*C10K 1/34* (2006.01)
*C10J 3/48* (2006.01)
*C10J 3/00* (2006.01)
*C10K 3/02* (2006.01)
*B01J 23/40* (2006.01)
*B01J 21/06* (2006.01)

(56) References Cited

U.S. PATENT DOCUMENTS

| | | |
|---|---|---|
| 2005/0095183 A1 | 5/2005 | Rehmat et al. |
| 2007/0099038 A1 | 5/2007 | Galloway |
| 2009/0324471 A1 | 12/2009 | Simell et al. |
| 2010/0040527 A1 | 2/2010 | Randhava et al. |
| 2010/0187479 A1 | 7/2010 | Patel et al. |
| 2011/0062387 A1 | 3/2011 | Anfang et al. |

FOREIGN PATENT DOCUMENTS

| | | | |
|---|---|---|---|
| EP | 1770058 A1 | 4/2007 | |
| EP | 2 210 858 A2 | 7/2010 | |
| FI | 110691 B | 3/2003 | |
| FI | 118647 B | 1/2008 | |
| WO | 03/000829 A1 | 1/2003 | |
| WO | WO 2007/116121 A1 | 10/2007 | |
| WO | WO 2009/132959 A2 | 11/2009 | |
| WO | WO 2009/132960 A2 | 11/2009 | |
| WO | WO 2011/107661 A1 | 9/2011 | |

OTHER PUBLICATIONS

Written Opinion (PCT/ISA/237) issued on Jun. 9, 2011, by the Finnish Patent Office as the International Searching Authority for International Application No. PCT/FI2011/050181.

Finnish Search Report issued on Nov. 11, 2010 for Application No. 20105201.

Finnish Office Action issued on Nov. 15, 2010 for Application No. 20105201.

European Search Report issued on Feb. 3, 2012 for Application No. 11179907.8.

Pekka Simell, "Catalytic Hot Gas Cleaning of Gasification Gas", VTT Publications 330, Technical Research Centre of Finland, Jan. 30, 1998, the whole book.

Pekka Simell et al., "Catalytic Purification of Tarry Fuel Gas", Fuel, Oct. 1990, vol. 69, pp. 1219-1225, Appendix I.

Jukka Leppalahti et al., "Catalytic Conversion of Nitrogen Compounds in Gasification Gas", Fuel Processing Technology, 1991, vol. 29, pp. 43-56, Appendix II.

Pekka A. Simell et al., "Catalytic Purification of Tarry Fuel Gas With Carbonate Rocks and Ferrous Materials", Fuel, vol. 71, Feb. 1992, pp. 211-218, Appendix III.

Pekka Simell et al., "Formation and Catalytic Decomposition of Tars From Fluidized-Bed Gasification", Proceeding of the Conference Advances in Thermochemical Biomass Conversion., May 11-15, 1992, vol. 1, pp. 265-279, Appendix IV.

Pekka A. Simell et al., "Tar-Decomposing Activity of Carbonate Rocks Under High $CO_2$ Partial Pressure", Fuel, 1995, vol. 74, No. 6, pp. 938-945, Appendix V.

P. Simell et al., "Gasification Gas Cleaning With Nickel Monolith Catalyst", Development in Thermochemical Biomass Conversion, vol. 2, Blackic Academic & Professional, pp. 1103-1116, Appendix VI.

Pekka A. Simell et al., "Catalytic Decomposition of Gasification Gas Tar With Benzene as the Model Compound", Industrial & Engineering Chemistry Research, 1997, vol. 36, No. 1, pp. 42-51, Appendix V11.

Pekka A. Simell et al., "Effects of Gasification Gas Components on Tar and Ammonia Decomposition Over Hot Gas Cleanup Catalysts", Fuel, 1997, vol. 76, No. 12, pp. 1117-1127, Appendix V111.

Office Action issued by the U.S. Patent and Trademark Office in the U.S. Appl. No. 13/598,299, mailed Mar. 14, 2013, U.S. Patent and Trademark Office, Alexandria, VA. (18 pages).

International Preliminary Report on Patentability issued on Sep. 4, 2012, by the Finnish Patent Office for Application No. PCT/FI2011/050181.

David Sutton, Brian Kelleher, Julian R. H. Ross, "Review of literature on catalysts for biomass gasification," Fuel Processing Technology 73 (2001) pp. 155-173.

Sami Toppinen et al., U.S. Appl. No. 13/598,299, filed Aug. 29, 2012.

Second Office Action dated Mar. 19, 2014, issued by State Intellectual Property Office of People's Republic China in corresponding Chinese Application No. 201180012068.6 (translation only).

First Office Action dated Jul. 9, 2013, issued by State Intellectual Property Office of People's Republic China in corresponding Chinese Application No. 201180012068.6, with English Translation thereof.

Supplementary European Search Report and Written Opinion issued in co-pending European Application No. 11750242.7 dated Oct. 27, 2014.

\* cited by examiner

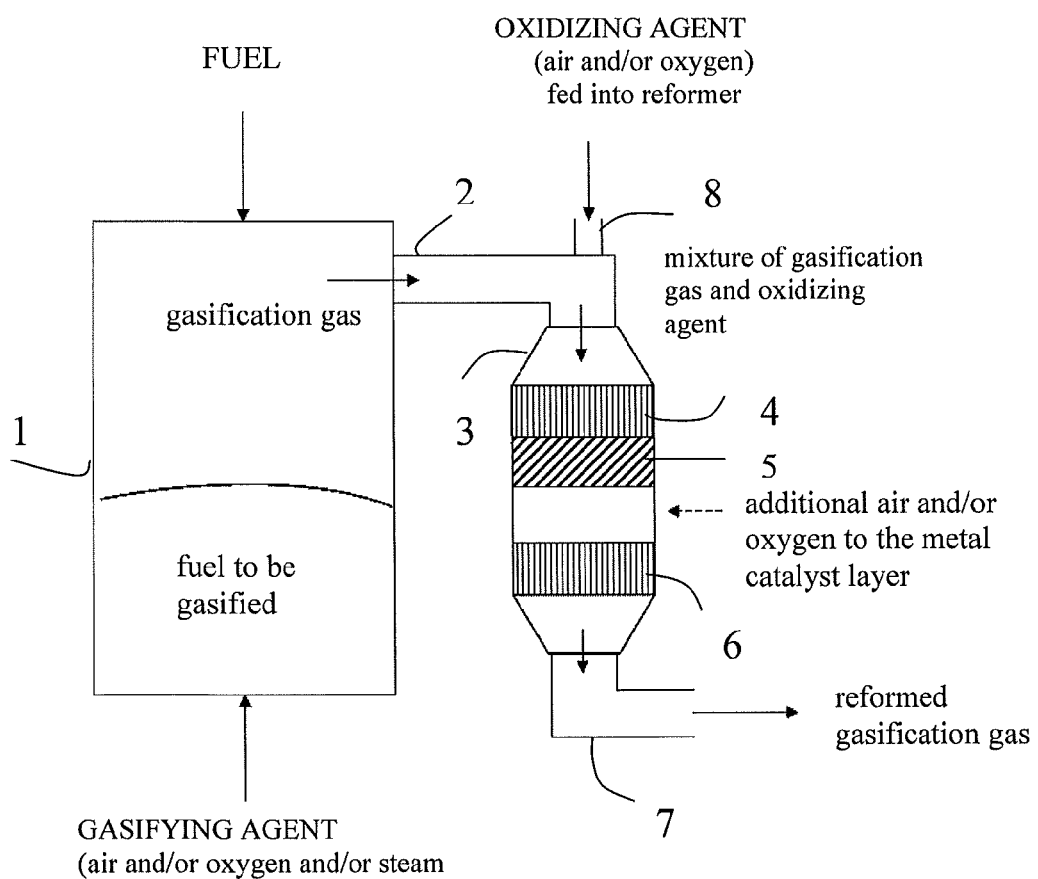

METHOD OF REFORMING GASIFICATION GAS

RELATED APPLICATION(S)

This application claims priority as a continuation application under 35 U.S.C. §120 to PCT/FI2011/050181, which was filed as an International Application on Mar. 3, 2011 designating the U.S., and which claims priority to Finnish Application No. FI20105201 filed in Finland on Mar. 3, 2010. The entire contents of these applications are hereby incorporated by reference in their entireties.

FIELD

Disclosed is a method of reforming gasification gas. Gasification gas can be brought into contact with a metal catalyst in a reformer in the presence of an oxidizing agent, to decompose organic impurities that are comprised in the gasification gas. Also disclosed is the use of a noble metal catalyst in the pre-reforming of gasification gas.

BACKGROUND INFORMATION

Oxygen or water vapor gasification of biomass, such as wood, peat, straw or logging waste, can generate gas which comprises hydrogen approximately 35-45% by volume, carbon monoxide 20-30% by volume, carbon dioxide 15-25% by volume, methane approximately 8-12% by volume, and nitrogen 3-5% by volume. It is possible to use this gas as, for example, a synthesis gas of diesel-category fuels. Steam/oxygen gasification of biomass can be an interesting alternative economically, for example, when the scale of operation is large enough.

Problems associated with gasification can include, for example, variations in gas composition and amounts of impurities. It is possible to purify gasification gas efficiently from tar impurities and ammonia which are contained in it by using catalysts at a high temperature. Examples of catalysts which are suitable for decomposing tar are nickel catalysts and dolomites, the operating temperatures of which can be at minimum 800-900° C. For example, gasification technology is disclosed by Pekka Simell, Catalytic hot gas cleaning of gasification gas, VTT Publications 330, Espoo 1997.

A zirconium catalyst (FI patent 110691), which has been developed by VTT Technical Research Centre of Finland, also works relatively efficiently in decomposing tars, for example, heavier hydrocarbons. In addition, the zirconium catalyst enables the use of a considerably wider temperature range than does a nickel catalyst, for example, a temperature range of 600-900° C.

When using nickel catalysts, the high temperature employed can present a problem. Use of such high temperature can form soot (coke) during the process of the catalytic gas conditioning. The coking problem can be made worse in applications of synthesis gas, in which light hydrocarbons (for example, methane) are intended to be reformed as efficiently as possible. In this case, the metal catalysts, for example, nickel, are used at very high temperatures (950 to 1100° C.). The generation of soot causes accumulations of carbon deposits on the catalysts and the reactor, and may eventually result in clogging the whole reactor.

At the start-up of the gasification process, the use of nickel or other metal catalysts presents problems because the temperature in the catalytic unit is relatively low, for example, below 700° C. During the start-up, the operation of the gasifier may occasionally be unstable, and the tar content of the product gas may then occasionally rise extremely high. These conditions may together cause an accumulation of carbon on the nickel catalyst and clogging of the catalyst reactor, and accelerate deactivation of the nickel catalyst.

A catalytic reformer, which is used in the purification of gasification gas, can be heated by using partial oxidation (partial combustion) of the gas in a position before the catalyst bed or in the catalyst bed, in which case the process is called an "autothermal reforming." After the gas is oxidized, its temperature increases considerably, in which case also the number of the thermal, i.e. coking, side reactions increases.

It is possible to reduce the coking of the metal catalyst in the reformer by using phased reforming. Phased reforming means that the reforming is carried out in several stages, for example, several sequential reaction zones, in which two or more catalysts are used.

According to FI Patent Application No. 118647 (Method for reforming a gas containing tar impurities, inventors: P. Simell and E. Kurkela), in the first stage of a phased reformer ("pre-reforming stage" or "pre-reformer"), a zirconium catalyst is used. While the gas is being partly oxidized in the zirconium catalyst, the heaviest tar compounds are decomposed into gas components. Almost no carbon is generated in the zirconium catalyst and, consequently, no carbon blockage of the reactor takes place.

However, results of the trial runs which were carried out show that the use of a zirconium catalyst in the pre-reformer does not always reduce the generation of coke adequately. This applies in cases where very high temperatures (for example, over 900° C.) are employed in the secondary stage. Such occasions occur for example in applications of synthesis gasification in which a nickel catalyst is used at high temperatures for the actual reforming.

In conditions such as these, to ensure the functionality of the process, it can be desirable to prevent the generation of coke in the first catalyst layers (pre-reforming stage).

SUMMARY

According to an exemplary aspect, a method of reforming gasification gas to decompose organic impurities contained in the gasification gas is provided, the method comprising: introducing a gasification gas into at least one first pre-reforming stage containing a noble metal catalyst, and downstream from the at least one first pre-reforming stage, introducing a gas into at least one second reforming stage containing a metal catalyst, wherein the gasification gas is contacted with the noble metal catalyst of the at least one first pre-reforming stage in the presence of an oxidizing agent, and/or the gas is contacted with the metal catalyst of the at least one second reforming stage in the presence of an oxidizing agent.

According to an exemplary aspect, a method is provided wherein the noble metal catalyst of the first pre-reforming stage is effective to reduce an accumulation of carbon in the metal catalyst of the second reforming stage, in comparison with a situation where the noble metal catalyst is absent.

According to an exemplary aspect, a method of producing and reforming gasification gas, the method comprising: forming a gasification gas from a gasifiable fuel, introducing the gasification gas into at least one first pre-reforming stage containing a noble metal catalyst, and downstream from the at least one first pre-reforming stage, introducing a gas into at least one second reforming stage containing a metal catalyst, wherein the gasification gas is contacted with the noble metal catalyst of the at least one first pre-reforming stage in the presence of an oxidizing agent, and/or the gas is contacted with the metal catalyst of the at least one second reforming stage in the presence of an oxidizing agent.

BRIEF DESCRIPTION OF THE DRAWINGS

FIG. 1 is a process flow diagram of a system for reforming gasification gas, in accordance with an exemplary aspect.

DETAILED DESCRIPTION

An exemplary aspect of the present disclosure is based on the principle that organic impurities (such as, for example, tar and light hydrocarbons, such as ethylene and butadiene) which are contained in the gasification gas can be decomposed in a catalytic reformer at a temperature of approximately 500 to 900° C., and in the presence of a noble metal catalyst.

A gasification gas can be brought into a multi-stage reforming system, wherein in at least one first stage of which a noble metal catalyst is used. In a second stage which follows a first stage, a reforming catalyst can be used which comprises metal such as, for example, nickel or a noble metal. The noble metal catalyst of the first stage can reduce problems of the metal catalysts of the secondary stage of the reformer, which problems can be associated with the generation of carbon.

For example, by using noble metal catalysts in the pre-reforming of gasification gas, problems arising from the generation of carbon in the metal catalysts of the secondary stage of a reformer can be reduced or eliminated.

For example, the use of a noble metal catalyst can reduce the risk of deactivation of the metal catalysts and, consequently, can increase the operating life of the catalyst. If the reactions for generating carbon can be reduced or prevented, blockage of the reactor caused by the generation of coke can also be reduced or prevented. It is possible to utilize an exemplary process or system, for example, in any suitable power plants or chemical industry processes that are based on gasification and in which it can be desirable to reduce or eliminate the presence of tar in the gas. Examples of such processes can include, for example, the production of electricity from gasification gas by using an engine or a turbine (IGCC), and the production of synthesis gas, for example for synthesis of fuels or methanol.

In the following, exemplary aspects of the present disclosure are described. FIG. 1 shows a simplified process flowchart of an exemplary embodiment.

As described above, disclosed is a treatment of gasification gas by reforming. For example, the reforming can be carried out in several stages, in which case in at least one first stage, the actual reforming catalyst used can be a metal catalyst, such as a nickel or a noble metal catalyst.

For example, the first stage can be a pretreatment stage, in which light hydrocarbons that are contained in the gasification gas, and the heaviest tar compounds that appear as intermediate products, can be decomposed. Light compounds which are to be decomposed can include unsaturated $C_1$-$C_6$ hydrocarbons, for example, olefinic hydrocarbons. Examples of these can include $C_1$-$C_6$ hydrocarbons, such as, for example, ethylene and butadiene, which can comprise one or two double bonds.

The reaction in the first stage can be carried out in the presence of an oxidizing agent. Heat can be generated in the reaction, and the heat can be utilized in the actual reforming stage. For example, the oxidizing agent can be fed into the gasification gas before the agent is led into the first stage of the reforming.

According to an exemplary embodiment, the output flow from the first stage can be introduced directly into the reforming in the second stage.

According to an exemplary embodiment, an oxidizing agent can be fed into the reforming in the second stage as well. For example, it can be possible to feed the oxidizing agent, as an intermediate feed, into the output flow of the first stage, before the agent is led into the reforming in the second stage.

The pre-reforming can be significant, for example, in this second exemplary application, for example, because the role of light olefinic hydrocarbons and tar compounds in generating coke becomes more pronounced when the temperature of the gas increases greatly after the pre-reforming zone. Such an event can occur, for example, when oxygen is fed into the secondary stage of the reformer.

In exemplary applications, for example, air, oxygen or a mixture thereof can be used as an oxidizing agent.

For example, the temperature of the first reforming stage can be in the range of 500 to 900° C. The temperature range of the second stage may overlap the temperature of the first stage. In an exemplary embodiment, the temperature of the second stage can be higher than the temperature of the first stage. In an exemplary embodiment, the operation can be carried out at a temperature above 900° C., for example at a temperature which is above 900° C. and below 1500° C.

In the pre-reforming and, optionally, in the actual reforming, a noble metal catalyst can be used, the metal of which can be chosen from the metals of groups 8-10 in the periodic table. For example, at least one metal of the groups 8-10 in the periodic table, such as Ru, Rh, Pd or Pt, can act as the noble metal catalyst. The noble metal catalyst can be used as a single component or as a combination of two or more metals.

It is possible to use self-supporting metal catalysts. Bearing in mind, for example, the cost of these metals and their mechanical resistance, it can be economical to use a carrier in the catalyst. For example, metals can function on the surface of a carrier, such as for example on the surface of aluminum oxide or zirconium oxide. The amount of metal in the catalyst can be within the range of 0.01 to 20% by weight, for example, 0.1 to 5% by weight, calculated from the weight of the carrier.

Noble metal catalysts (both for the pre-reforming and for the actual reforming) can be produced in any suitable manner. For example, the metals can be added into the carrier using any method which can be applied in the production of catalysts. An example of these is impregnation into the carrier. For example, the impregnation can be carried out by dispersing or by dissolving the metal or its precursor into a suitable medium, from which the metal is attached to the carrier by the process of precipitating or layering. It is also possible, for example, to bring the metal or its precursor to the carrier from a vapor phase, either by condensing the compound onto the surface or by binding it directly from the vapor phase to the carrier by means of chemisorption.

The carrier can include a coating (washcoat) for instance on a particle or on a ceramic or a metallic honeycomb. It is also possible that a honeycomb or a particle can work as such, for example, without a washcoat layer, as a carrier of noble metals.

It is also possible to use nickel, for example, a Ni/C catalyst as the reforming catalyst, for example, as described in Pekka Simell, Catalytic hot gas cleaning of gasification gas, VTT Publications 330, Espoo 1997.

An exemplary process can comprise one or more pretreatment zones. It is possible to arrange a noble metal catalyst in several reaction beds which are arranged in series in the direction of the gas flow. Between the reaction beds, a heat recovery device can be arranged. The reaction zones can have catalyst beds all of which comprise the same noble metals, or the reaction zones can have catalyst beds which comprise different catalysts. For example, different noble metals can be used in the beds of sequential noble metal catalysts.

In an exemplary embodiment, the pretreatment zone can comprise at least one zirconium catalyst zone and at least one noble metal catalyst zone.

For example, the zirconium catalyst zone can be arranged in the direction of flow in a position before the noble metal catalyst stage.

The zirconium catalyst, for example, zirconium-based catalyst, can be produced from zirconium oxide ($ZrO_2$) which is alloyed with another metal oxide, such as, for example, aluminum oxide ($Al_2O_3$). The percentage of zirconium oxide or a corresponding zirconium compound in the alloy can be, for example, more than 50% of the weight of the alloy.

The zirconium compound can be on the surface of an inert carrier, or impregnated into the carrier. It can also be the coating of a ceramic or metallic honeycomb.

For example, the zirconium catalyst can be used and produced in any suitable manner, for example, as described in FI Patent No. 118647, the contents of which are hereby incorporated by reference.

The zirconium catalyst can work in a similar way to the application according to the above FI patent, and it can decompose the heaviest tar compounds which generate carbon, and it can enhance the operation of both the noble metal catalyst and the secondary stage of the reformer.

An exemplary pre-reforming zone which is based on the combination of zirconium/noble metal catalyst is shown in the accompanying drawing, in which the combination of a gasifier 1 and a reforming unit 3 is represented by a simplified diagram.

In an exemplary embodiment, at least one bed which comprises a zirconium-based catalyst can be arranged in a position before one or several (for example, 1-5) noble metal beds. Such a catalyst bed of the reforming, which bed is first in the flow direction, for example, a first zirconium-based catalyst bed, can efficiently protect the noble metal catalyst in such a way that, for example, this catalyst is not coked to the point where it ceases to function.

According to another exemplary embodiment, a nickel bed can be arranged after the noble metal bed. It can be possible and economical to arrange a zirconium-based catalyst layer described above in a position before the noble metal bed, which layer reduces or prevents coking of the noble metal layer.

In an exemplary embodiment shown in FIG. 1, at least one of pre-reforming zones 4, 5 can comprise a noble metal catalyst, and a reforming zone 6 can comprise a metal catalyst. A feed pipe 2 can feed in the gasification gas, and an outlet pipe 7 can remove the reformed gas.

Gas which comprises, among others, hydrogen and carbon monoxide can be generated in a gasifier 1, from a gasifiable fuel such as, for example, biomass, with the help of a gasifying material. Air, oxygen or water vapor, or a mixture of two or more of these, can act as the gasifying material. The gasifying material can be fed into the gasifier from below and the fuel (which is heavier than air) from above. The gasifier can be any suitable reactor such as, for example, a fluidized bed reactor, a circulating mass reactor or a similar reactor.

Before the gas is introduced to the reforming unit 3, an oxidizing agent can be fed into the gasification gas in order to generate reforming. If desired, the particles can be separated from the gas already in this stage, or before the oxidizing agent is added, for example, before the first reforming stage.

The gas can be introduced to the upper part of the reactor, via the feed pipe 2 into the reforming unit 3. For example, it can be possible to efficiently purify the gasification gas of tar impurities and ammonia contained in it by using catalysts at a high temperature.

In an exemplary embodiment, the pre-reforming zone can comprise two subsequent catalyst zones 4, 5, the first being a zirconium catalyst layer 4 and the second being a noble metal catalyst layer 5.

The pre-reforming zones 4, 5 can be installed in the direction of the gas flow in a position before the reforming catalyst 6, as shown in FIG. 1.

It is also possible to arrange the reactor of the pre-reforming zones 4, 5 in such a way that the zirconium and the noble metal catalysts in it are layered. For example, the zirconium catalyst can be the first one in the gas flow, in a position before the noble metal catalyst layer.

The reforming catalytic zone 6 can be in a position following the last noble metal catalyst bed of the pre-reforming zone 4, 5, in the direction of the gas flow. The reforming catalytic zone 6 can comprise nickel catalyst or another similar actual reforming catalyst. As mentioned above, it is possible to introduce oxygen or air or other oxidizing agent into the reforming zone in order to increase the temperature.

As shown in FIG. 1, an oxidizing agent can be fed into the output flow of the pre-reformation. For example, the actual reforming zone 6 of the reforming unit 3 can be divided into one or more zones in such a way that each one constitutes noble metal catalyst layers and nickel catalyst layers, as described above. The treatment of the gas can be carried out in separate reactors, which are positioned in relation to the gas flow as described above.

During the reformation which can take place in the noble metal catalyst, light intermediate product compounds, for example, ethene and butadiene, which form carbon and very heavy tar compounds, can be decomposed.

Space velocity of the gas in the reforming unit, for example, the first and/or second stages, can be 500 to 50 000 1/h, for example, approximately 1000 to 20 000 1/h.

The output flow of the reformation can be of sufficient quality as a synthesis gas for diesel-category fuels or corresponding hydrocarbons. The output flow can be led through the outlet pipe 7 to further processing. In an exemplary embodiment, the outlet pipe 7 can be connected to a synthesis gas reactor (not shown).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of reforming gasification gas to decompose organic impurities contained in the gasification gas, the method comprising:

introducing a gasification gas into at least one first pre-reforming stage comprising a zirconium catalyst stage and a noble metal catalyst stage in series, wherein the zirconium catalyst stage is arranged in a direction of flow before the noble metal catalyst stage, and downstream from the at least one first pre-reforming stage, introducing a gas into at least one second reforming stage containing a metal catalyst, wherein the at least one second reforming stage is effective to reduce a content of a tar impurity, ammonia, or a combination thereof of the gas introduced into the at least one second reforming stage, wherein the gasification gas is contacted with the noble metal catalyst of the at least one first pre-reforming stage in the presence of an oxidizing agent, and/or the gas is contacted with the metal catalyst of the at least one second reforming stage in the presence of an oxidizing agent.

2. The method according to claim 1, wherein an effluent of the at least one first pre-reforming stage is introduced directly into the at least one second reforming stage.

3. The method according to claim 1, wherein the oxidizing agent is introduced to the gasification gas before the gasification gas is introduced into the first pre-reforming stage.

4. The method according to claim 1, wherein the oxidizing agent includes air, oxygen or a mixture thereof.

5. The method according to claim 1, further comprising introducing an oxidizing agent into the second reforming stage.

6. The method according to claim 1, wherein a temperature of the first pre-reforming stage is in a range of 500 to 900° C., and a temperature of the second reforming stage is above 900° C.

7. The method according to claim 1, wherein the zirconium catalyst stage is effective to protect the noble metal catalyst from coking.

8. The method according to claim 1, wherein the zirconium catalyst comprises a zirconium compound.

9. The method according to claim 1, wherein the zirconium catalyst comprises zirconium oxide, which is alloyed with another metal oxide, or the zirconium compound is on the surface of an inert carrier or impregnated into a carrier.

10. The method according to claim 1, wherein a space velocity of the gas in the first and/or second stages is 500 to 50,000 1/h.

11. The method according to claim 1, wherein the noble metal catalyst includes at least one metal of groups 8 to 10 in the periodic table.

12. The method according to claim 1, wherein the metals operate on the surface of a carrier, wherein an amount of metal in the noble metal catalyst is in a range of 0.01 to 20% by weight, calculated from the weight of the carrier.

13. The method according to claim 1, wherein the noble metal catalyst of the first pre-reforming stage is effective to reduce an accumulation of carbon in the metal catalyst of the second reforming stage, in comparison with a situation where the noble metal catalyst is absent.

14. The method according to claim 1, wherein the zirconium catalyst comprises zirconium oxide ($ZrO_2$).

15. The method according to claim 1, wherein the zirconium catalyst comprises zirconium oxide, which is alloyed with aluminum oxide.

16. The method according to claim 1, wherein a space velocity of the gas in the first and/or second stages is about 1,000 to 20,000 1/h.

17. The method according to claim 1, wherein the noble metal catalyst includes at least one metal selected from the group consisting of Ru, Rh, Pd, Pt and a combination thereof.

18. The method according to claim 1, wherein the metals operate on the surface of a carrier containing aluminum oxide, zirconium oxide or a combination thereof, wherein an amount of metal in the noble metal catalyst is in a range of 0.1 to 5% by weight, calculated from the weight of the carrier.

19. The method according to claim 1, wherein the gasification gas is contacted with the noble metal catalyst of the at least one first pre-reforming stage in the presence of an oxidizing agent, and the gas is contacted with the metal catalyst of the at least one second reforming stage in the presence of an oxidizing agent.

20. A method of producing and reforming gasification gas, the method comprising:

forming a gasification gas from a gasifiable fuel, introducing the gasification gas into at least one first pre-reforming stage comprising a zirconium catalyst stage and a noble metal catalyst stage in series, wherein the zirconium catalyst stage is arranged in a direction of flow before the noble metal catalyst stage, and downstream from the at least one first pre-reforming stage, introducing a gas into at least one second reforming stage containing a metal catalyst, wherein the at least one second reforming stage is effective to reduce a content of a tar impurity, ammonia, or a combination thereof of the gas introduced into the at least one second reforming stage, wherein the gasification gas is contacted with the noble metal catalyst of the at least one first pre-reforming stage in the presence of an oxidizing agent, and/or the gas is contacted with the metal catalyst of the at least one second reforming stage in the presence of an oxidizing agent.

21. The method according to claim 1, wherein the gasifiable fuel includes a biomass.

22. The method according to claim 20, wherein an effluent of the at least one first pre-reforming stage is introduced directly into the at least one second reforming stage.

23. The method according to claim 20, wherein the noble metal catalyst includes at least one metal selected from the group consisting of Ru, Rh, Pd, Pt and a combination thereof.

24. The method according to claim 20, further comprising introducing an oxidizing agent into the second reforming stage.

25. The method according to claim 24, wherein the oxidizing agent includes air, oxygen or a mixture thereof.

* * * * *